United States Patent
Prasadarao

(10) Patent No.: US 8,141,056 B2
(45) Date of Patent: Mar. 20, 2012

(54) JUST-IN-TIME DYNAMIC INSTRUMENTATION

(75) Inventor: Akulavenkatavara Prasadarao, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/061,874

(22) Filed: Apr. 3, 2008

(65) Prior Publication Data

US 2009/0254889 A1  Oct. 8, 2009

(51) Int. Cl.
  *G06F 9/44* (2006.01)
(52) U.S. Cl. ....................................... 717/130
(58) Field of Classification Search ............ 717/130
  See application file for complete search history.

(56) References Cited

U.S. PATENT DOCUMENTS

| | | | |
|---|---|---|---|
| 6,918,110 B2 | 7/2005 | Hundt et al. | |
| 7,401,323 B2 * | 7/2008 | Stall et al. | 717/130 |
| 2002/0129337 A1 * | 9/2002 | Evans et al. | 717/124 |
| 2003/0149960 A1 | 8/2003 | Inamdar | |
| 2004/0168156 A1 | 8/2004 | Hundt et al. | |
| 2004/0210876 A1 * | 10/2004 | Stall et al. | 717/127 |
| 2005/0114848 A1 * | 5/2005 | Choi et al. | 717/148 |
| 2006/0112037 A1 | 5/2006 | Chagoly et al. | |
| 2006/0277371 A1 | 12/2006 | Cohn et al. | |
| 2006/0277540 A1 | 12/2006 | Bhattacharya | |
| 2007/0006159 A1 | 1/2007 | Hecht et al. | |
| 2007/0006167 A1 | 1/2007 | Luk et al. | |
| 2008/0052696 A1 * | 2/2008 | Pradadarao | 717/158 |
| 2008/0215922 A1 * | 9/2008 | Cheng et al. | 714/39 |

OTHER PUBLICATIONS

M. Ronsse et al., "JiTI: A Robust Just in Time Instrumentation Technique," 2000, pp. 1-12.
Cantrill et al., "Dynamic Instrumentation of Production Systems," 2004, pp. 1-14.
A. Tamches, "Fine-Grained Dynamic Instrumentation of commodity Operating System Kernels," 2001, pp. 1-14.

* cited by examiner

*Primary Examiner* — Philip Wang
(74) *Attorney, Agent, or Firm* — Walter W. Duft

(57) ABSTRACT

Just-in-time dynamic instrumentation of a running software system may be achieved by registering one or more instrumentation probe handlers in an inactive state wherein the probe handlers reside in a memory space associated with the software system but are not instrumented into the software system. The probe handlers may each have one or more probe handler tags representing categories to which the probe handlers have been assigned. Tag query requests are periodically received and processed in order to provide information to a caller about registered probe handlers associated with a probe handler tag specified in the tag query request. A probe handler activation request can be made by specifying a probe handler or a probe handler tag. The request can be processed by placing the specified probe handler, or probe handlers associated with the tag, in an active state. The software system thus becomes dynamically instrumented to execute the probe handler(s) as part of the software system's execution flow. The activated probe handler(s) may be returned to the inactive state in response to a probe handler deactivation request specifying a probe handler or a probe handler tag.

20 Claims, 8 Drawing Sheets

JUST-IN-TIME DYNAMIC INSTRUMENTATION

BACKGROUND OF THE INVENTION

1. Field of the Invention

The present invention relates to diagnostic tools for analyzing software. More particularly, the invention is directed to the dynamic instrumentation of running software in order to gather runtime data as the software executes. Still more particularly, the invention concerns a technique for implementing a just-in-time dynamic instrumentation.

2. Description of the Prior Art

By way of background, in order to analyze the operation of a complex system such as a large software program, it is important to be able to gather operational information while the system is running, without halting execution, modifying the system, and then restarting it. One approach is to dynamically add instrumentation code to the running system when data is needed, so that there is no performance penalty. This is in contrast to statically instrumenting the system when it is created, which offers no flexibility. Operating systems are examples of complex systems that may require diagnosis at run time, as are many user-space applications, such as database management programs. As shown in FIG. 1A, it is often desirable to probe some software function to determine information about its operation, such as how often or why the function is being called. The software memory location where the function is to be probed is referred to as the probe point. As shown in FIG. 1B, dynamic instrumentation may be implemented by adding a software interrupt (e.g., an Int 3 breakpoint in x86 processors) (the probe) at the probe point in the running system and providing a probe handler that is executed when the interrupt throws an exception. The probe handler executes instrumentation code (an instrumentation function) that obtains the required information and provides it to the probe user, then returns control to the running system. Examples of such conventional dynamic instrumentation software include the Linux® System Tap framework. This framework provides a Linux® tool that allows application developers and system administrators to write probe scripts that will be automatically parsed, elaborated upon, translated, compiled and loaded as a kernel module to generate probe data from a running operating system kernel. Probing of user-space programs is also supported.

The manner in which conventional dynamic instrumentation solutions are invoked so as to become operational in a running software system has a number of disadvantages. For example, when dynamic instrumentation is implemented using an operating system kernel module, starting the instrumentation probe requires loading the kernel module and setting the breakpoint. Stopping the probe requires removing the breakpoint and unloading the module. This is not a practical way to activate dynamic instrumentation. Among other things, there is a delay associated with starting and stopping the instrumentation probe. Moreover, root privileges are typically required to load and unload the module, and there is no known programmatic way to turn the instrumentation on and off from a user-space application. This means that such applications cannot take advantage of this type of dynamic instrumentation. Note that it is impractical to pre-load the instrumentation kernel module because loading the module automatically activates the instrumentation, which should not run during normal operations (when probing is not being performed) due to the overhead associated with the instrumentation code.

Another conventional instrumentation approach places conditional static probes in the program code so that the probes only execute when instrumentation is desired. However, the probes alter the execution flow of a program on a permanent basis and add performance overhead by inserting a condition checking code path into the target program being instrumented, as follows:

if (probing);
do some probing work.

By default, when probing is not active the above "if" condition fails and the probing code is not active. When probing needs to be activated, the "if" condition variable is made true. This technique imposes a performance penalty due to the condition processing of the "if" statement.

Accordingly, it would be desirable to provide a techinque whereby a probe handler providing dynamic instrumentation can be easily activated and deactivated. What is needed is a technique that facilitates just-in-time dynamic instrumentation that does not have the overhead associated with conventional techniques. The ability to activate and deactivate dynamic instrumentation from user-space applications would be of further benefit. It would be additionally advantageous if instrumentation probes could be assigned to groups that can be specified when activating and deactivating instrumentation probes.

SUMMARY OF THE INVENTION

The foregoing problems are solved and an advance in the art is obtained by a novel method, system and computer program product for just-in-time dynamic instrumentation of a running software system. The just-in-time instrumentation may be achieved by registering one or more instrumentation probe handlers in an inactive state wherein the probe handlers reside in a memory space associated with the software system but are not instrumented into the software system. The probe handlers may each have one or more probe handler tags representing categories to which the probe handlers have been assigned. Tag query requests may be periodically received and processed in order provide information to a caller about registered probe handlers. A probe handler activation request can be made by specifying a probe handler or a probe handler tag. The request can be processed by placing the specified probe handler, or probe handlers associated with the tag, in an active state. The software system thus becomes dynamically instrumented to execute the probe handler(s) as part of the software system's execution flow. The activated probe handler(s) may be returned to the inactive state in response to a probe handler deactivation request specifying a probe handler or a probe handler tag.

BRIEF DESCRIPTION OF THE DRAWINGS

The foregoing and other features and advantages of the invention will be apparent from the following more particular description of exemplary embodiments, as illustrated in the accompanying Drawings, in which.

DETAILED DESCRIPTION OF EXEMPLARY EMBODIMENTS

Figure 1A:
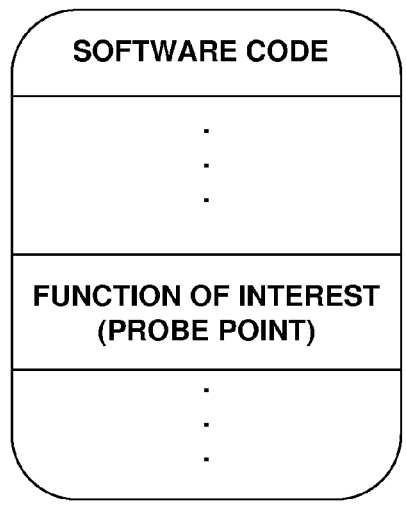
FIG. 1A is a diagrammatic illustration of a portion of a software memory space containing software code, including a function of interest to be probed using a prior art technique.
Figure 1B:
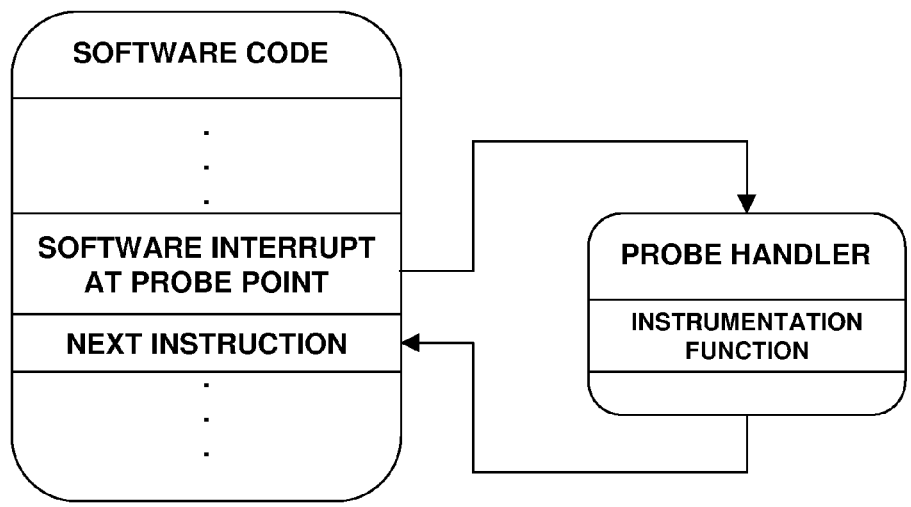
FIG. 1B is a diagrammatic illustration of the memory space portion of FIG. 1A showing the insertion of a software interrupt at a probe point associated with the function of interest, and further showing another memory space portion containing a probe handler that executes an instrumentation function according to a prior art technique.
Figure 2:
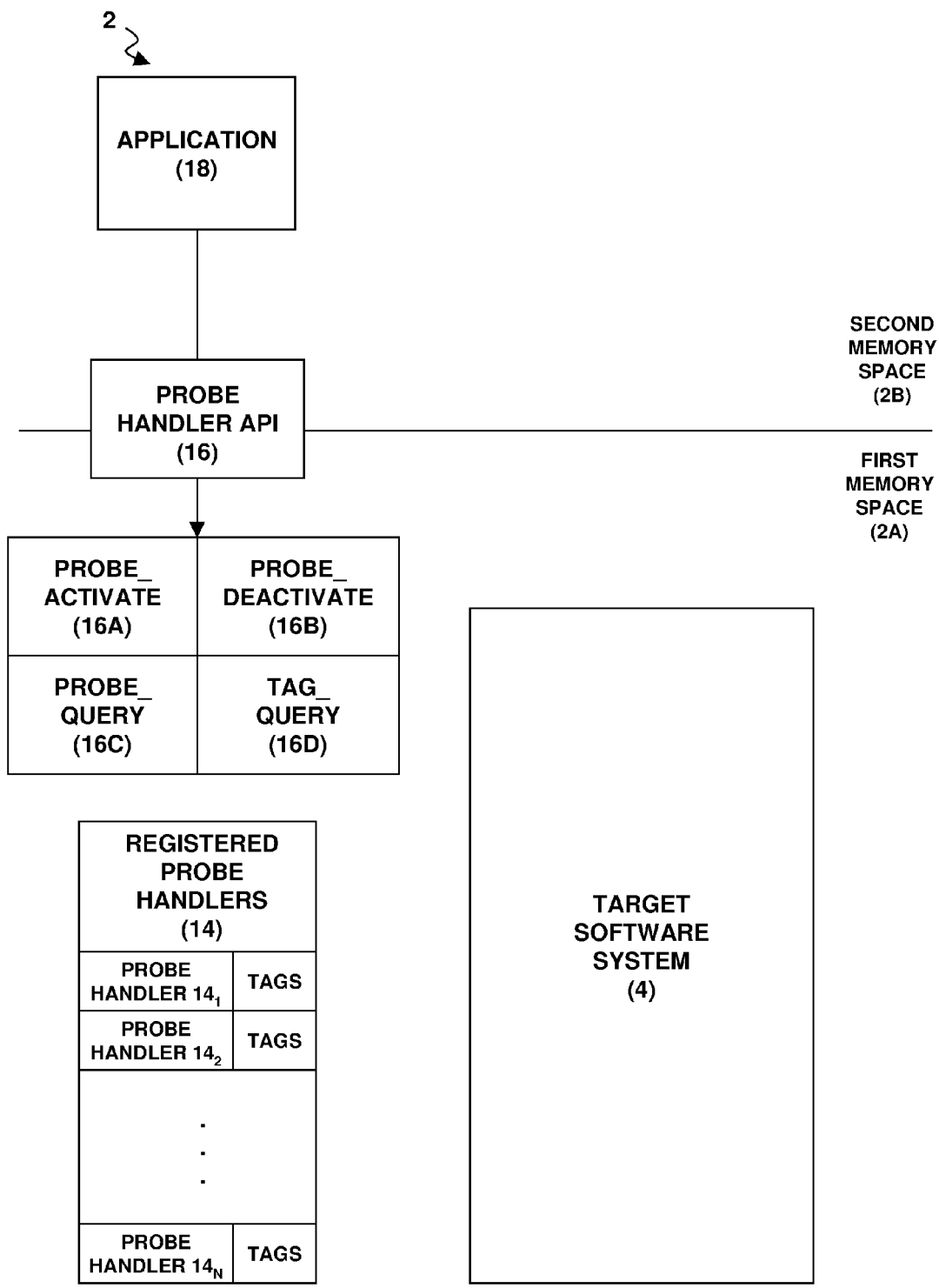
FIG. 2 is a functional block diagram showing components of a just-in-time dynamic instrumentation system adapted to perform dynamic instrumentation of running software in accordance with the present disclosure.

Turning now to the Drawing figures wherein like reference numerals indicate like components in all of the several views, FIG. 2 illustrates an exemplary just-in-time dynamic instrumentation system 2. Although the instrumentation system 2 may be variously implemented in software, firmware, hardware, or any combination thereof, the following discussion is based on an exemplary embodiment wherein the instrumentation system 2 comprises software program logic that is capable of execution on commodity data processing systems, including personal computers, workstations, as well as more complex hardware such as midrange and mainframe computers. According to this exemplary software implementation, the software logic of the instrumentation system 2 may collectively reside in a first memory space 2A (shown on the lower side of FIG. 2) and a second memory space 2B (shown on the upper side of FIG. 2), so as to be available for execution on a central processing unit (CPU) (see discussion of FIG. 5 below) having access to the memory. A software system 4, representing a dynamic instrumentation target, additionally resides in the first memory space 2A. To further facilitate the present discussion, it will be assumed by way of example only that the software system 4 represents a base operating system, such as the Linux® kernel. The first memory space 2A may thus comprise an operating system kernel memory (e.g., a privileged memory space) in which the software system 4 resides. The second memory space 2B may comprise a user application memory space (e.g., a non-privileged memory space) in which resides user-space applications. It should be understood that the disclosed embodiment represents only one exemplary implementation of the invention, and that the dynamic instrumentation system 2 could also be used with other types of software system 4. For example the target software system could be a user application program, library, etc. that runs in the second memory space 2B. In that case, the entire instrumentation system 2 could potentially run in the second memory space 2B, such that the first memory space 2A is not be utilized and there is only one memory space for the instrumentation system and the target software system.

The instrumentation system 2 is adapted to implement just-in-time dynamic instrumentation of the software system 4 to facilitate runtime diagnosis thereof. As described by way of background above, dynamic instrumentation refers to the ability to dynamically insert instrumentation code in a running system, as opposed to statically inserting the instrumentation code at compile time. The instrumentation system 2 provides the capability of registering dynamic instrumentation modules (probe handlers) in an inactive state in which instrumentation code resides in memory but does not alter the execution flow of the target software. One can then activate the inactive instrumentation code on an as-needed basis when instrumentation data collection is desired. The instrumentation system 2 provides the additional ability to identify its instrumentation code using tags that allow the instrumentation code (probe handlers) to be assigned to predefined categories and then grouped, searched and activated based on the predefined categories.

Figure 3:
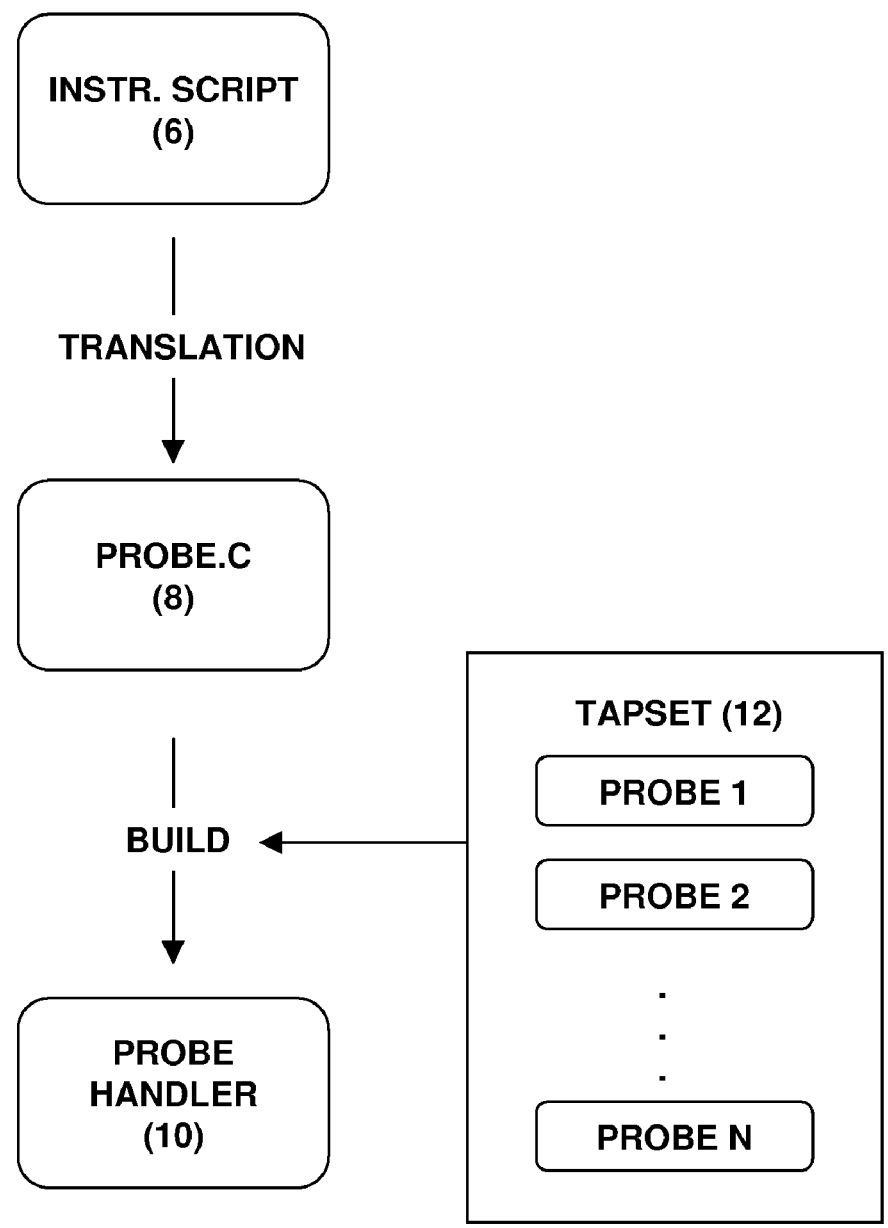
FIG. 3 is a combined block and flow diagram showing the operation of one possible prior art system that may be used to generate probe handlers for the instrumentation system of FIG. 2.

Although not a requirement, the instrumentation system 2 may be conveniently modeled on the System Tap instrumentation infrastructure supported by current versions of the Linux® kernel. Other types of instrumentation software could also be used, and the discussion of the System Tap program is not intended to in any way limit the scope of the disclosed instrumentation technique. As shown in FIG. 3, the prior art System Tap program allows instrumentation code to be generated using a simple scripting language. Input to the System Tap program consists of an instrumentation script 6 written in the scripting language. The instrumentation script is translated into a C-language source code file 8 (probe.c), and the source code file 8 is compiled and built into a binary probe handler 10. If the target software system is the Linux® kernel, the probe handler will be a Linux® kernel module (probe.ko) that can be loaded in the usual manner (e.g., using the "insmod" or "modprobe" commands). If necessary, one or more prewritten instrumentation functions can be used to build the kernel module 10. Each instrumentation function is written to operate at a predetermined location in a target software system. The combination of an instrumentation function and its target location is known as a probe. A library of probes written for a specific target software system is referred to a tapset. FIG. 3 shows an exemplary tapset 12 that includes multiple probes 1, 2 . . . n. The probe handler 10 includes the code specified by the script writer who wrote the instrumentation script 6 for a given probe point, along with various runtime System Tap functions added during the translation phase, and possibly one or more probes from the tapset 12. When loaded, the probe handler 10 is placed in memory and instrumented into the target software system as a set of machine language instructions that are native to the underlying CPU. A breakpoint is set at the probe point of the target software system that results in the probe handler's instrumentation code being executed whenever the probe point is reached. The instrumentation code usually generates statistical information concerning a specific operation of the target software system. As one alternative to this type of probe handler, probe handlers could be written entirely in a compilable language such as "C."

Returning now to FIG. 2, the instrumentation system 2 may be implemented to maintain a probe handler library 14 in the first memory space 2A. The probe library 14 may include one or more probe handlers $14_1, 14_2 \ldots 14_n$. Each probe handler $14_1, 14_2 \ldots 14_n$ of FIG. 2 may include an instrumentation function that operates at an address in the target software system 4 to implement a probe. In accordance with the present disclosure, each probe handler $14_1, 14_2 \ldots 14_n$ may be further associated with one or more tags that represent categories to which the probe handler is assigned. Examples of such tags include the functional area to which the probe handler $14_1, 14_2 \ldots 14_n$ belongs or an application, user or group that utilizes the probe handler. A probe handler API (Application Program Interface) 16 allows registered probe handlers to be queried, as well as activated and deactivated. These commands can be initiated from the second memory space 2B. Advantageously, the probe handler queries can be performed using probe tags and are not limited to specific probe handler names or registered numbers. The tags may be easily incorporated into the probe handlers when they are created.

The probe handlers $14_1, 14_2 \ldots 14_n$ may be added to the target software system in conventional fashion, for example, as loadable modules. However, unlike some existing instrumentation mechanisms (such as System Tap), the probe handlers $14_1, 14_2 \ldots 14_n$ are initially in an inactive state and are not immediately instrumented into the target software system 4. As long as the probe handlers $14_1, 14_2 \ldots 14_n$ remain inactive, the control flow paths of the target software system 4 remain unaffected and the probe handlers generate zero processing overhead because they do not execute.

As further shown in FIG. 2, the probe handler API 16 may include two functions 16A (probe_activate) and 16B (probe_deactivate) that respectively implement logic for activating and deactivating the probe handlers $14_1, 14_2 \ldots 14_n$. The functions 16A and 16B can be called by an application 18 in the second memory space 2B that desires to activate or deactivate one or more of the probe handlers $14_1, 14_2 \ldots 14_n$. Although not shown, an interface could also be provided to allow callers within the same memory space as the target software system 4 to activate and deactivate the probe handlers $14_1, 14_2 \ldots 14_n$. The application 14 could be any type of software, including a user interface that receives manual input commands from a human user. If the first memory space 2B is an operating system kernel memory, the functions 16A and 16B can be implemented as system calls. When the probe_activate function 16A is invoked by the application 18 (or other caller), one or more of the probe handlers $14_1, 14_2 \ldots 14_n$ targeted by the function call will be activated in the target software system 4. As described by way of background above, this can be done by setting a breakpoint at the address specified in the probe handler $14_1, 14_2 \ldots 14_n$. The probe_deactivate function 16B causes the breakpoint to be removed, thereby restoring the target software system 4 to its native state.

As previously stated, the probe handler API 16 may provide additional functions for querying the probe handlers $14_1, 14_2 \ldots 14_n$, such as a probe_query function 16C and a tag_query function 16D. These may be implemented as system calls if the first memory space is an operating kernel memory. The probe_query function 16C allows the application 18 (or other caller) to query all of the loaded probe handlers $14_1, 14_2 \ldots 14_n$ by name, registration number, or other identifier. This is useful when it is desired to verify that certain probe handlers $14_1, 14_2 \ldots 14_n$ are in fact loaded in the first memory space 2A. The probe_query function 16C may also be used to determine the tags associated with a specified probe handler $14_1, 14_2 \ldots 14_n$. The tag query function 16D may then be called to identify related probe handlers. Tags may also be used to filter the query results. The tag_query function 16D allows the application 22 (or other caller) to query the loaded probe handlers $14_1, 14_2 \ldots 14_n$ according to their associated tags. This information can be used by the application 18 (or other caller) to identify probe handlers $14_1, 14_2 \ldots 14_n$ of interest based on common characteristics specified by the probe handler tags. It is especially useful when the names of available probe handlers $14_1, 14_2 \ldots 14_n$ may not be known but the category or group to which the probe handlers belong (as specified by the tag) is known.

If desired, the probe_activate function 16A and the probe_deactivate function 16B may be designed to receive a probe handler tag as a parameter. This would allow the application 18 (or other caller) to activate all probe handlers $14_1, 14_2 \ldots 14_n$ that are members of the category or group associated with the tag, even though the individual probe handlers may not be known. When a probe handler tag is specified as a parameter to the probe_activate function 16A or the probe_deactivate function 16B, the function can itself invoke the tag_query function 16D to identify the probe handlers $14_1, 14_2 \ldots 14_n$ that need to be activated or deactivated, then activate or deactivate each identified probe handler.

According to an exemplary implementation of the instrumentation system 2 the logic needed to support the just-in-time instrumentation features described herein may be based on a modification of a prior art instrumentation mechanism. One such mechanism is the Kprobes system that provides kernel support for dynamically loading and unloading probe handlers. The Kprobes infrastructure is incorporated in current versions of the Linux® kernel. It includes a probe data structure for specifying a probe handler's instrumentation code and probe point, together with registration/deregistration functions that respectively enable the insertion of the instrumentation code in a running kernel and the subsequent removal thereof. A related prior art mechanism known as Jprobes may also be used a starting point for implementing the instrumentation features described herein. The Jprobes mechanism is based on the Kprobes mechanism but differs in that it is designed to access function arguments at runtime.

Figure 4:
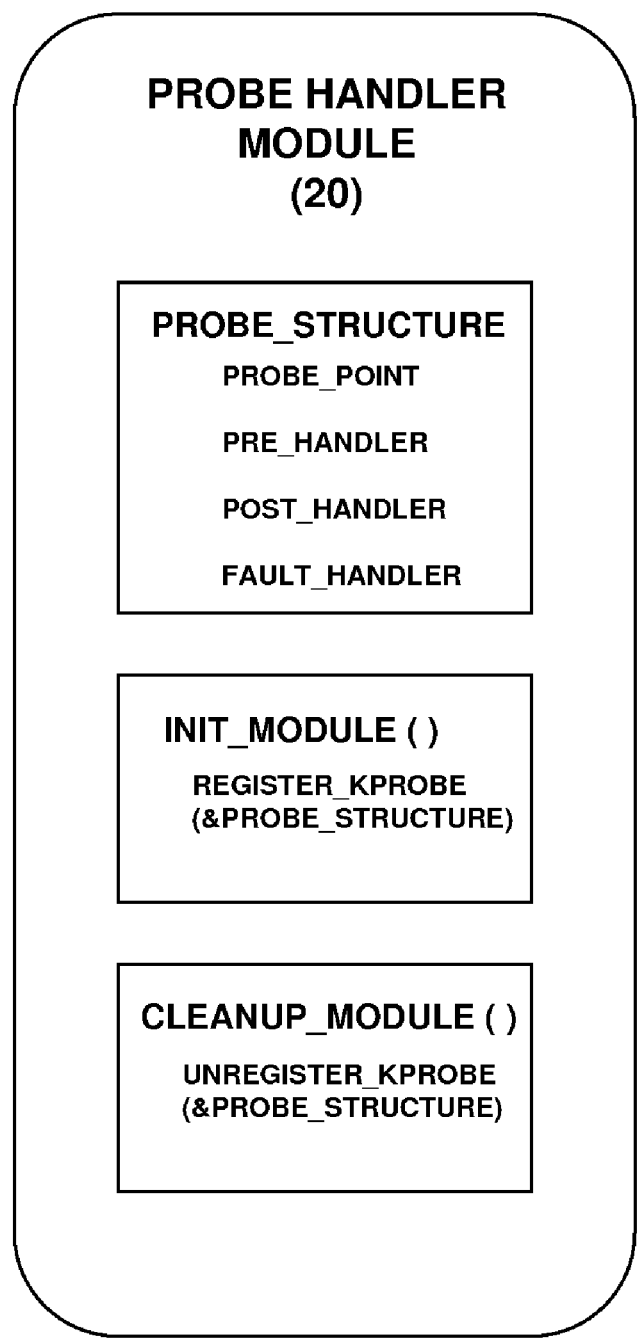
FIG. 4 is a block diagram showing a prior art probe handler module that has been used for conventional dynamic instrumentation.

FIG. 4 shows a prior art kernel module 20 for dynamically loading a probe handler using the Kprobes mechanism. The module 20 includes the probe data structure labeled probe_structure and a pair of functions respectively labeled init_module( ) and cleanup_module( ). The probe data structure identifies the probe point (e.g., as a linear address) and specifies three probe handling functions that may be implemented when the probe point is reached. The pre_handler field of the probe data structure is a function pointer to a probe handling function that is run before execution of the probed instruction. The post_handler field of the probe data structure is a function pointer to a probe handling function that is run following execution of the probed instruction. The fault_handler field of the probe data structure is a function pointer to a function that is run if there is a fault during execution of the probe handling code.

The other two entities of the probe handler module 20 represent standard function names that are used in Linux® kernel modules to delineate the start point and the end point of a module's functionality, respectively. In the probe handler module 20, the init_module( ) function is used to call the Kprobes registration function with the address of the probe data structure as a function parameter (e.g., register_probe (&probe_structure)). When the probe handler module 20 is loaded, a conventional kernel module loader loads the probe handler functions (containing the instrumentation code) into appropriate memory locations. The init_module( ) function then implements the Kprobes registration function, which loads the probe data structure into a memory hash table (indexed by the probe point location) and inserts a breakpoint at the probe point location. The cleanup_module( ) function is used to call the Kprobes deregistration function with the address of the probe data structure as a function parameter (e.g., unregister_probe (&probe_structure)). The Kprobes deregistration function removes the breakpoint, restores the original instruction to the probe point location, and removes the probe data structure from the probe hash table. Then the kernel module loader unloads (frees) the instrumentation code from memory.

Figure 5:
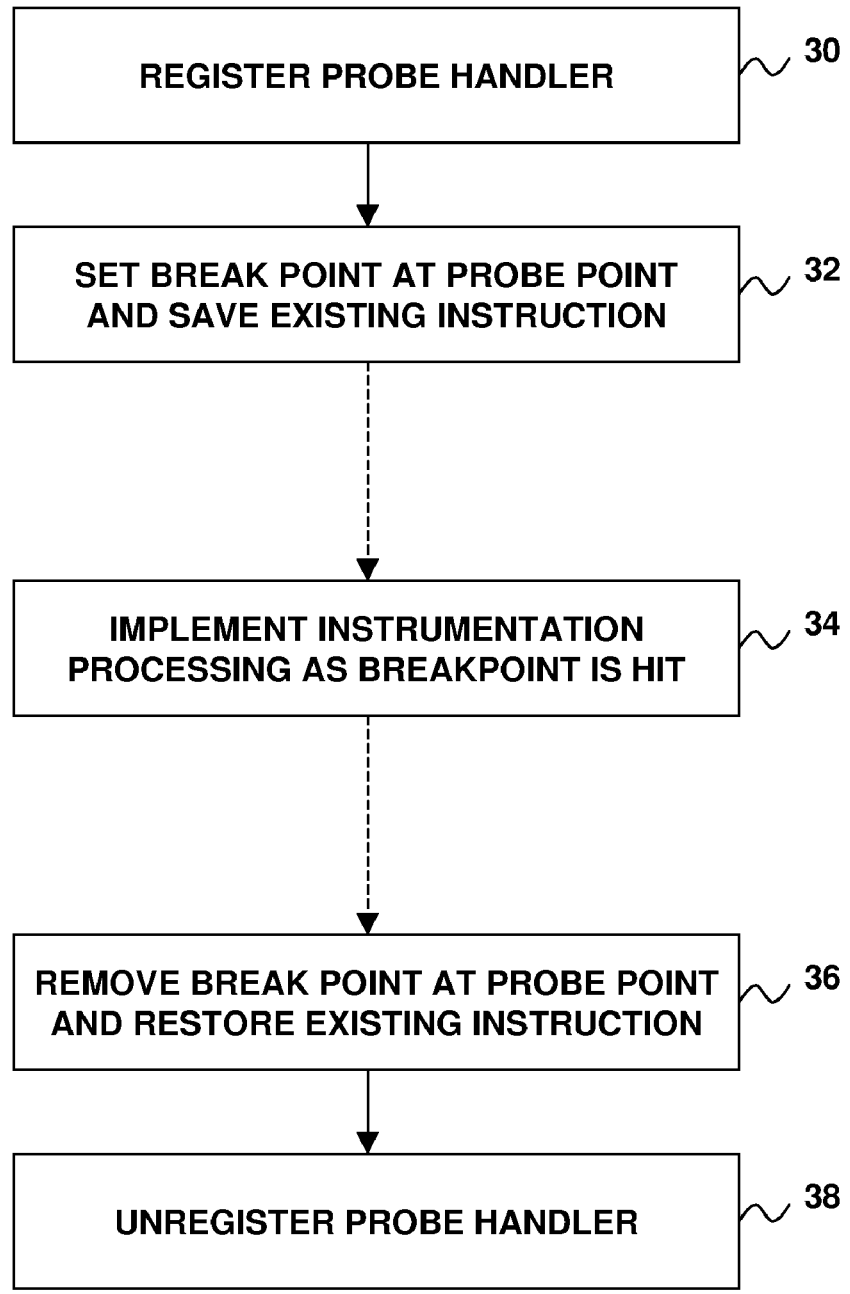
FIG. 5 is a flow diagram showing a prior art technique for loading and automatically activating a probe handler in a dynamic instrumentation system.

FIG. 5 shows the logic associated with implementing a probe handler module according to the prior art Kprobes mechanism. In block 30, the probe data structure and the associated probe handler instrumentation code is loaded in memory. In block 32, a break point is set at the probe point and the existing instruction is saved to a buffer. Block 34 represents the actual instrumentation processing, which is performed until the probe handler module is subsequently unloaded. According to the prior art Kprobes mechanism, a trap handler is invoked when the breakpoint is hit. The trap handler determines whether there is a registered probe handler for the break point. If there are no probe handlers, normal trap handling is performed. If a registered probe handler is found, any specified pre_handler function is executed. The original instruction is then executed, followed by the post_handler function (if one is specified). The trap handler then terminates and control is returned to the instruction that follows the break point. When instrumentation is no longer desired, the previously inserted break point is removed and the original instruction is restored in block 34. In block 38, the probe data structure and the probe handler instrumentation code are unloaded from memory.

Figure 6:
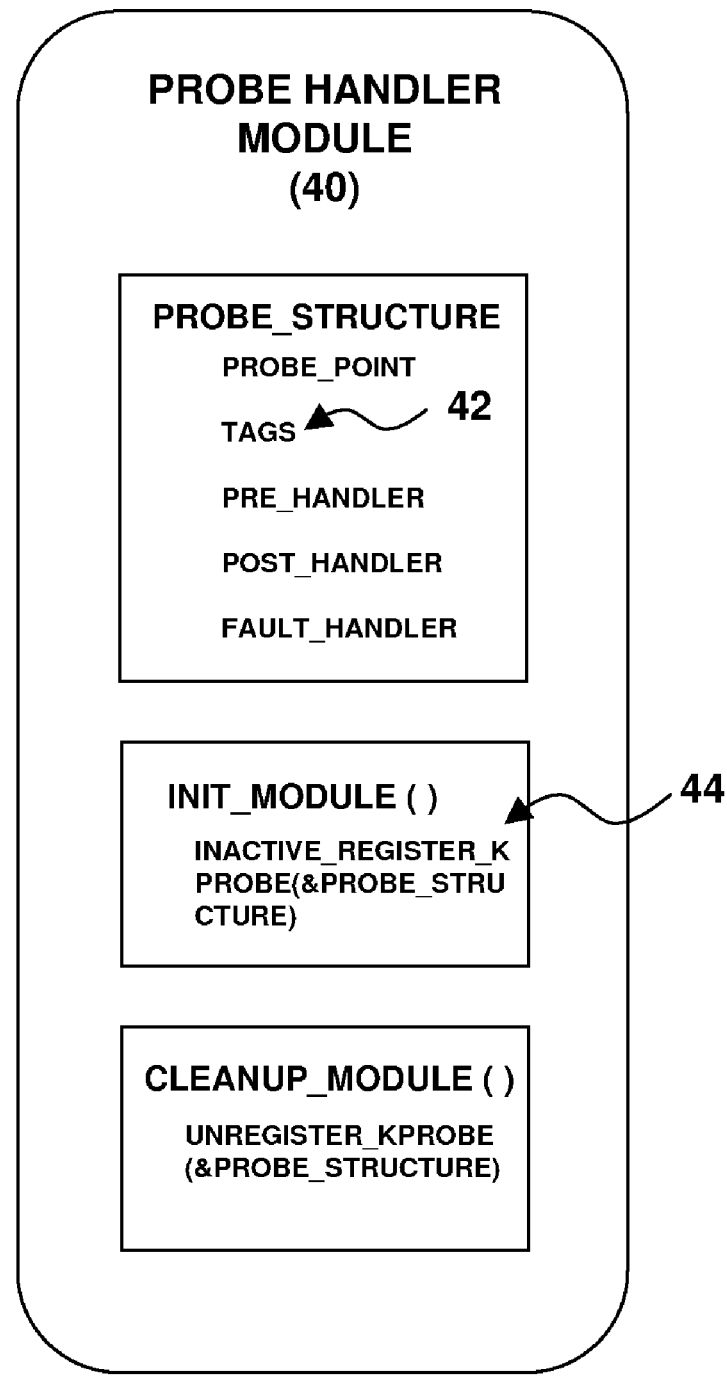
FIG. 6 is a block diagram showing an improved probe handler module that may be used as a probe handler in the instrumentation system of FIG. 2 to facilitate just-in-time instrumentation.
Figure 7:
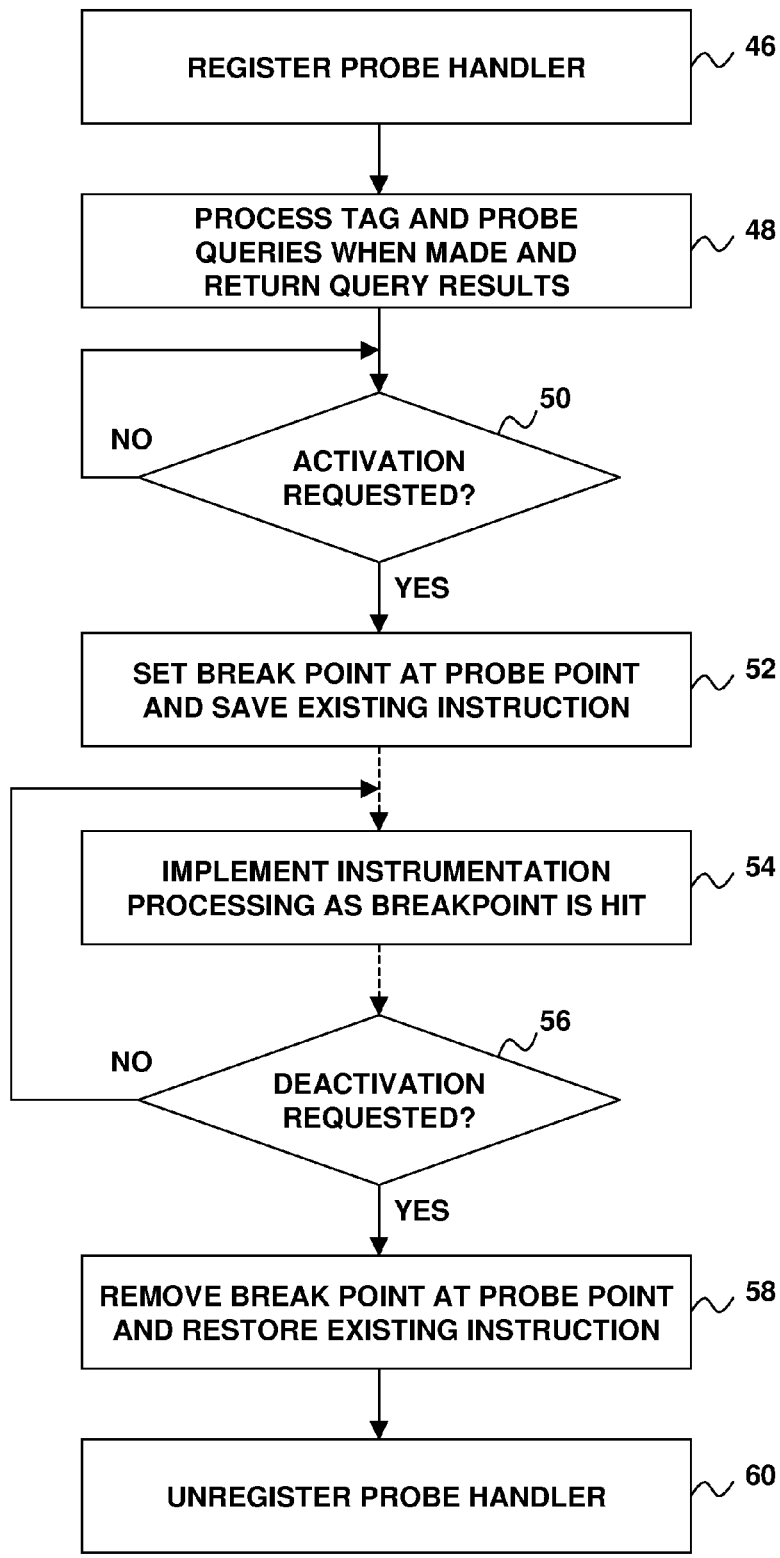
FIG. 7 is a flow diagram showing operations of the instrumentation system of FIG. 2 to support probe handler queries and selective activation/deactivation of probe handlers in the instrumentation system of FIG. 2.

Turning now to FIGS. 6 and 7, modifications can be made to the prior art Kprobes mechanism that will support probe handler activation/deactivation and tag query processing in accordance with the present disclosure. FIG. 6 illustrates a Kprobes probe handler module 40 whose probe data structure that has been modified to add a field 42 for tags as shown in FIG. 2. Whenever the probe data structure is registered as part of loading the probe handler module 40, the tags field 42 can be searched by the tag query function 16D of FIG. 2. If one of the tags in the tags field 42 matches the search query, the tag query function 16D can return additional information about the probe handler module 40, such as the name of its pre_handler or post_handler function. The probe handler module 40 also specifies a modified probe handler registration function 44 that may be referred to as inactive_register_probe (&probe_structure).

FIG. 7 illustrates a exemplary probe handler registration/deregistration and activation/deactivation operations that may be performed in accordance with the present disclosure. In block 46, the probe data structure 42 and its associated probe handler instrumentation code are registered in the inactive state. This may be referred to as a register-inactive operation, and results in the probe handler 40 being loaded in memory (e.g., the first memory space 2A of FIG. 2), but with no breakpoint being set in the target software system. A conventional module loading function (e.g., modprobe or insod) may be used to initiate loading of the probe handler module 40 and the probe handler registration function 44 will complete the registration. In this state, there is zero processing overhead because the normal control flow of the target software system has not been altered. This functionality may be implemented by modifying the prior art Kprobes registration function so that it supports the register-inactive operation.

In block 48, the probe_query function 16C and the tag_query function 16D respectively process probe queries and tag queries upon request and return query results, e.g., to the application 18. As previously described, a probe query is a query based on a known probe handler identifier that seeks to determine if the specified probe handler is loaded in memory. A tag query is a query based on a specified probe handler tag that seeks to identify all probe handlers $14_1$, $14_2 \ldots 14_n$ that are members of a particular category or group, as identified by the tag.

In block 50, the probe handler remains in the inactive state until the probe_activate function 16A is called by the application 18. As previously described, activation requests can be based on probe handler identifiers or tag identifiers. When this happens, the probe_activate function 16A sets a breakpoint in the target software system and the original instruction that resided at the breakpoint is saved in a buffer. In block 54, the activated probe instrumentation code performs its instrumentation processing whenever the break point is reached. The activated probe handler continues to run in this fashion until the probe_deactivate function 16B is called in block 56. When this occurs, the probe_deactivate function 16B removes the breakpoint instruction from the probe point and the original instruction is reinserted, as shown in block 58. The probe handler is now back in the inactive state and will remain so unless and until it is reactivated in block 48 or unregistered in block 60 (e.g., by unloading the probe handler module 40).

Figure 8:
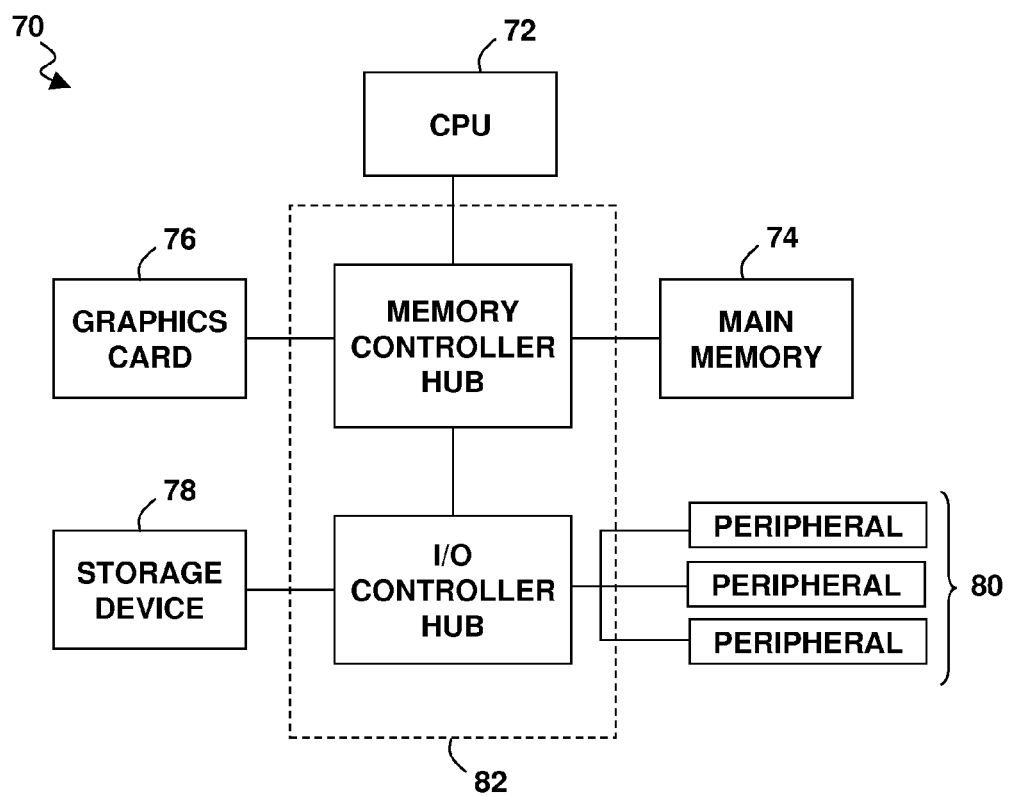
FIG. 8 is a block diagram illustrating an exemplary hardware environment in which the instrumentation system of FIG. 2 may be implemented.

Accordingly, a technique for just-in-time dynamic instrumentation of running software has been disclosed. It will be appreciated that the foregoing concepts may be variously embodied in any of a data processing system, a machine implemented method, and a computer program product in which programming logic is provided by one or more machine-readable media for use in controlling a data processing system to perform the required functions. Relative to a data processing system and machine implemented method, FIG. 8 illustrates an exemplary hardware environment 80 in which the instrumentation system 2 may be implemented. The hardware environment 80 includes one or more of a CPU or other data processing resource 82, a physical memory 84 providing the first memory space 2A and the second memory space 2B, an optional graphics card 86 for generating visual output to an optional monitor (not shown), a peripheral storage device 88, other peripheral devices 90, and a bus infrastructure 92 interconnecting the foregoing elements. The target software system 4, the probe handlers $14_1, 14_2 \ldots 14_n$, the probe handler API 16 and its associated functions 16A-16D, the application 20, and the register-inactive logic 45 may be loaded in the physical memory 84. If the application 18 is a user interface, it may be accessed through user interaction with the peripheral devices 90 (e.g., keyboard, mouse, etc.).

Figure 9:
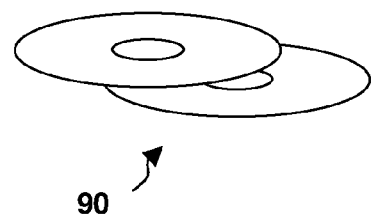
FIG. 9 is a diagrammatic illustration showing physical media that may be used to provide a computer program product for implementing a dynamic instrumentation system in accordance with the invention.

Relative to a computer program product having a machine-readable media and programming logic for controlling a data processing system, exemplary machine-readable media for providing such programming logic are shown by reference numeral 100 in FIG. 9. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality (such as an operating system). The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or signal-carrying medium (such as a network), or other entity that can contain, store, communicate, propagate or transport the programming logic for use by or in connection with a data processing system, computer or other instruction execution system, apparatus or device.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for just-in-time dynamic instrumentation of a running software system, comprising:
    registering one or more instrumentation probe handlers in an inactive state wherein said probe handlers reside in a memory space associated with said software system but are not instrumented into said software system;
    said one or more probe handlers each having one or more probe handler tags representing categories to which said one or more probe handlers have been assigned;
    processing a tag query request by providing information about registered probe handlers associated with a probe handler tag specified in said tag query request;
    processing a probe handler activation request specifying a probe handler or a probe handler tag by placing the specified probe handler, or probe handlers associated with said tag, in an active state by instrumenting said software system to execute said probe handler(s) as part of said software system's execution flow; and
    returning said activated probe handler(s) to said inactive state in response to a probe handler deactivation request specifying a probe handler or a probe handler tag.

2. A method in accordance with claim 1 wherein said tags represent one or more of a functional area to which said probe handlers belong or users or groups that utilize said probe handlers.

3. A method in accordance with claim 1 wherein said activation request and said deactivation request are made by specifying said tags, and wherein processing of said activation request and said deactivation request comprises implementing tag queries to identify probe handlers associated with said tags.

4. A method in accordance with claim 1 wherein said tag queries, said activation request and said deactivation request are received via a probe handler interface.

5. A method in accordance with claim 4 wherein said probe handler interface is adapted to be invoked by application callers residing in a memory space that is the same as or different from a memory space in which said target software system resides.

6. A method in accordance with claim 5 wherein said target software system and said instrumentation system are part of an operating system running in a kernel memory space, said probe handler interface is a system call interface, and said application callers comprise user applications running in a user memory space.

7. A data processing system programmed for just-in-time dynamic instrumentation of a running software system, comprising:
    a data processing resource;
    a memory space containing said software system;
    probe handler register-inactive logic adapted to register one or more instrumentation probe handlers in an inactive state wherein said probe handlers reside in said memory space but are not instrumented into said software system;
    said one or more probe handlers each having one or more probe handler tags representing categories to which said one or more probe handlers have been assigned;
    tag query logic adapted to process a tag query request by providing information about registered probe handlers;
    probe handler activation logic adapted to implement a probe handler activation request by placing one or more probe handlers in an active state by instrumenting said software system to execute said probe handler(s) as part of said software system's execution flow;
    a probe handler deactivation function adapted to implement a probe handler deactivation request by returning one or more activated probe handler(s) to said inactive state.

8. A system in accordance with claim 7 wherein said tags represent one or more of a functional area to which said probe handlers belong or users or groups that utilize said probe handlers.

9. A system in accordance with claim 7 wherein wherein said activation request and said deactivation request are made by specifying said tags, and wherein processing of said activation request and said deactivation request comprises implementing tag queries to identify probe handlers associated with said tags.

10. A system in accordance with claim 7 wherein said tag queries, said activation request and said deactivation request are received via a probe handler interface.

11. A system in accordance with claim 7 wherein said probe handler interface is adapted to be invoked by application callers residing in a memory space that is the same as or different from said memory space in which said target software system resides.

12. A system in accordance with claim 11 wherein said target software system and said instrumentation system are part of an operating system running in a kernel memory space, said probe handler interface is a system call interface, and said application callers comprise user applications running in a user memory space.

13. A computer program product, comprising:
    one or more machine readable media;
    programming logic provided by said machine readable media for programming a data processing platform to support just-in-time dynamic instrumentation of said running software system, as by:
    registering one or more instrumentation probe handlers in an inactive state wherein said probe handlers reside in a memory space associated with said software system but are not instrumented into said software system;
    said one or more probe handlers each having one or more probe handler tags representing categories to which said one or more probe handlers have been assigned;
    processing a tag query request by providing information about registered probe handlers associated with a probe handler tag specified in said tag query request;
    processing a probe handler activation request specifying a probe handler or a probe handler tag by placing the specified probe handler or probe handlers associated with said tag in an active state by instrumenting said software system to execute said probe handler(s) as part of said software system's execution flow; and returning said activated probe handler(s) to said inactive state in response to a probe handler deactivation request specifying a probe handler or a probe handler tag.

14. A computer program product in accordance with claim 13 wherein said tags represent one or more of a functional area to which said probe handlers belong or users or groups that utilize said probe handlers.

15. A computer program product in accordance with claim 13 wherein said activation request and said deactivation request are made by specifying said tags, and wherein processing of said activation request and said deactivation request comprises implementing tag queries to identify probe handlers associated with said tags.

16. A computer program product in accordance with claim 13 wherein said tag queries, said activation request and said deactivation request are received via a probe handler interface.

17. A computer program product in accordance with claim 16 wherein said probe handler interface is adapted to be invoked by application callers residing in a memory space that is the same as or different from a memory space in which said target software system resides.

18. A computer program product in accordance with claim 17 wherein said target software system and said instrumentation system are part of an operating system running in a kernel memory space, said probe handler interface is a system call interface, and said application callers comprise user applications running in a user memory space.

19. A computer program product, comprising:
one or more machine readable media;
programming logic provided by said machine readable media for programming a data processing platform to support just-in-time dynamic instrumentation of said running software system, as by:
registering one or more instrumentation probe handlers in an inactive state wherein said probe handlers reside in a memory space associated with said software system but are not instrumented into said software system;
said one or more probe handlers each having plural probe handler tags representing categories to which said one or more probe handlers have been assigned;
processing a tag query request by providing information about registered probe handlers associated with a probe handler tag specified in said tag query request;
processing a probe handler activation request specifying a probe handlers or a probe handler tag by placing the specified probe handler or probe handlers associated with said tag in an active state by instrumenting said software system to execute said probe handler(s) as part of said software system's execution flow;
returning said activated probe handler(s) to said inactive state in response to a probe handler deactivation request specifying a probe handler or a probe handler tag;
said activation request and said deactivation request being received via a probe handler interface that can be invoked by application callers; and
said target software system and said instrumentation system being part of an operating system running in a kernel memory space, said probe handler application program interface being a system call interface, and said application callers comprising user applications running in a user memory space.

20. A computer program product in accordance with claim 19 wherein said tags represent one or more of a functional area to which said probe handlers belong or users or groups that utilize said probe handlers.

* * * * *